US005782132A

United States Patent [19]

Ishibashi et al.

[11] Patent Number: 5,782,132

[45] Date of Patent: Jul. 21, 1998

[54] PRESSING MACHINE

[75] Inventors: Shigeo Ishibashi, Kanagawa; Tooru Miyashita, Sagamihara, both of Japan

[73] Assignee: Aida Engineering Ltd., Kanagawa, Japan

[21] Appl. No.: 723,780

[22] Filed: Sep. 30, 1996

[30] Foreign Application Priority Data

Jan. 11, 1996 [JP] Japan .................................... 8-020447

[51] Int. Cl.$^6$ .............................. B30B 1/06; F16H 21/18

[52] U.S. Cl. .............................. 74/44; 74/393; 100/282

[58] Field of Search ......................... 74/44, 393; 100/282

[56] References Cited

U.S. PATENT DOCUMENTS 2,962,993 12/1960 Johansen ................................ 74/44 X 3,315,596 4/1967 Peters ...................................... 74/44 X 4,095,523 6/1978 Drungil .................................. 100/282

*Primary Examiner*—Allan D. Herrmann

*Attorney, Agent, or Firm*—Wood, Phillips, Van Santen, Clark & Mortimer

[57] ABSTRACT

A mechanism for rotating a crankshaft at ununiform speeds through a main gear and a slider mechanism and a mechanism for rotating a crankshaft at a uniform speed through a main gear fixed to the crankshaft are constructed such that the distances between the centers of rotation of respective main gears and the centers of respective drive shafts are the same. A speed reducing ratio between a drive gear mounted on the drive shaft and the main gear is set to be the same, and the positions of the crankshaft and the drive shaft are set to be the same for both the mechanisms. When rotating the crankshaft at ununiform speeds, a lever provided for the slider mechanism is disposed to orient 180 degree out of phase with respect to the eccentric direction of a crankpin. This obviates a rotation balancing weight which has been provided on the crankshaft in the prior art. A pressing machine is thus provided wherein any of the ununiform rotation mechanism and the uniform rotation mechanism for rotating the crankshaft to drive a slide can be incorporated in the same frame.

2 Claims, 5 Drawing Sheets

PRESSING MACHINE

BACKGROUND OF THE INVENTION

For a slide driver which is incorporated in a frame of a pressing machine to vertically move a slide relative to a crankshaft through a connecting rod, there are known:

(a) a method of fixedly connecting a main gear to a crankshaft and rotating the crankshaft at a uniform speed by torque transmitted from the main gear, (b) a method of arranging a main gear and a crankshaft in eccentric relation, and coupling a lever provided on the crankshaft and the main gear through a link, thereby converting uniform rotation of the main gear into ununiform rotation of the crankshaft through an eccentric link mechanism comprising the link and the lever, as disclosed in, e.g., Japanese Examined Patent Publication No. 3-73399, and (c) a method of arranging a main gear and a crankshaft in eccentric relation, providing a lever on the crankshaft, forming a guide groove in the lever, and slidably engaging a slider provided on the main gear in the guide groove, thereby converting uniform rotation of the main gear into ununiform rotation of the crankshaft through a slider mechanism comprising the slider and the guide groove, as disclosed in, e.g., Japanese Examined Utility Model Publication No. 1-40634.

In the above prior-art slider driver for a pressing machine including an ununiform rotation mechanism, because the center of rotation of the main gear is not concentric with the center of the crankshaft, the position of a drive shaft of a uniform rotation mechanism is different from the position of a drive shaft of the ununiform rotation mechanism.

If the positions of both the drive shafts are intended to be concentric with each other, the following problem has occurred. Because the distance between the center of rotation of the main gear and the center of the drive shaft is not the same for the ununiform rotation mechanism and the uniform rotation mechanism, a drive gear mounted on the drive shaft and the main gear must be changed in size, resulting in the different numbers of teeth or different tooth sizes. Therefore, the power generating point of a mechanical press, the number of slide strokes per minute, working energy, etc. must be changed.

Further, to balance the rotation of the crankshaft, it has been required to provide a rotation balancing weight 180 degree out of phase with respect to the eccentric direction of the crankshaft. Unbalance due to the rotation of the slider mechanism is eliminated by so arranging the balance weight.

SUMMARY OF THE INVENTION

An object of the present invention is to provide a pressing machine, particularly a straight side type pressing machine, which enables the same frame to be used in any of a mechanism for rotating a crankshaft at ununiform speeds and a mechanism for rotating it at a uniform speed, and to obviate a rotation balancing weight which has been provided on the crankshaft of the ununiform rotation mechanism in the prior art.

To achieve the above object, in the present invention, a mechanism for rotating a crankshaft at ununiform speeds employs a slider mechanism disclosed in Japanese Examined Patent Publication No. 2-62118, a mechanism for rotating it at a uniform speed includes a main gear fixed to the center of the crankshaft, and a drive shaft is disposed in a position equi-distanced from both the center of rotation of a main gear of the ununiform rotation mechanism and the center of rotation of the main gear of the uniform rotation mechanism so that a drive gear provided on the drive shaft is used in common by both the uniform and ununiform rotation mechanisms. For both the mechanisms, therefore, the number of teeth and the tooth size of the main gear become the same, hence a speed reducing ratio also becomes the same, and the positions of the crankshaft and the drive shaft become the same. As a result, a frame of the mechanical press can be used in common.

Further, in the ununiform rotation mechanism, a lever provided for the slider mechanism is disposed to orient 180 degree out of phase with respect to the eccentric direction of a crankpin. This obviates a rotation balancing weight which has been provided on the crankshaft in the prior art.

DETAILED DESCRIPTION OF THE INVENTION

Embodiments of the present invention will be described below with reference to FIGS. 1 to 5.

Figure 1:
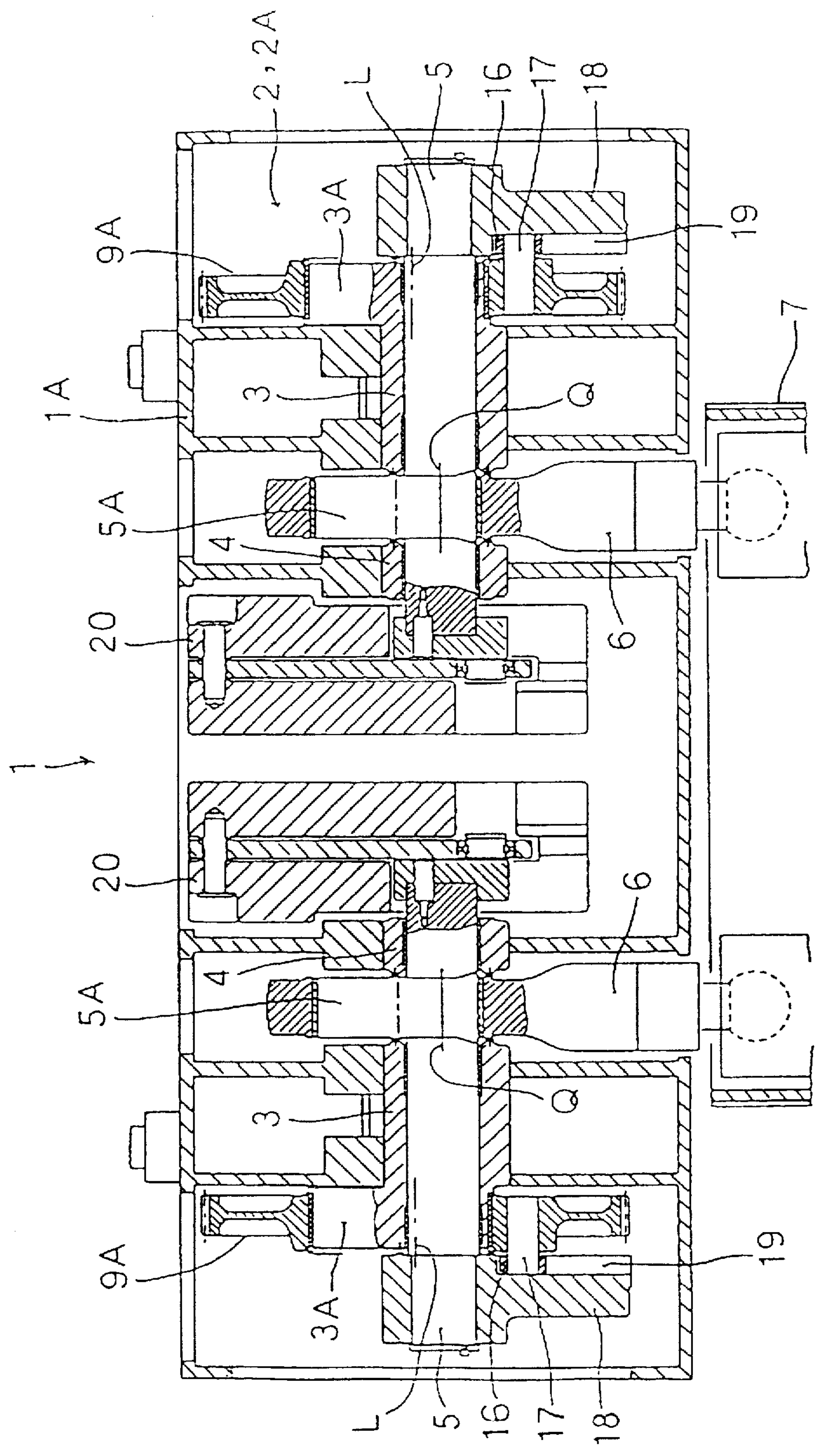
FIG. 1 shows a first embodiment of the present invention and is a front sectional view of a mechanical press including ununiform rotation mechanisms wherein main gears are disposed at both ends of a frame.
Figure 2:
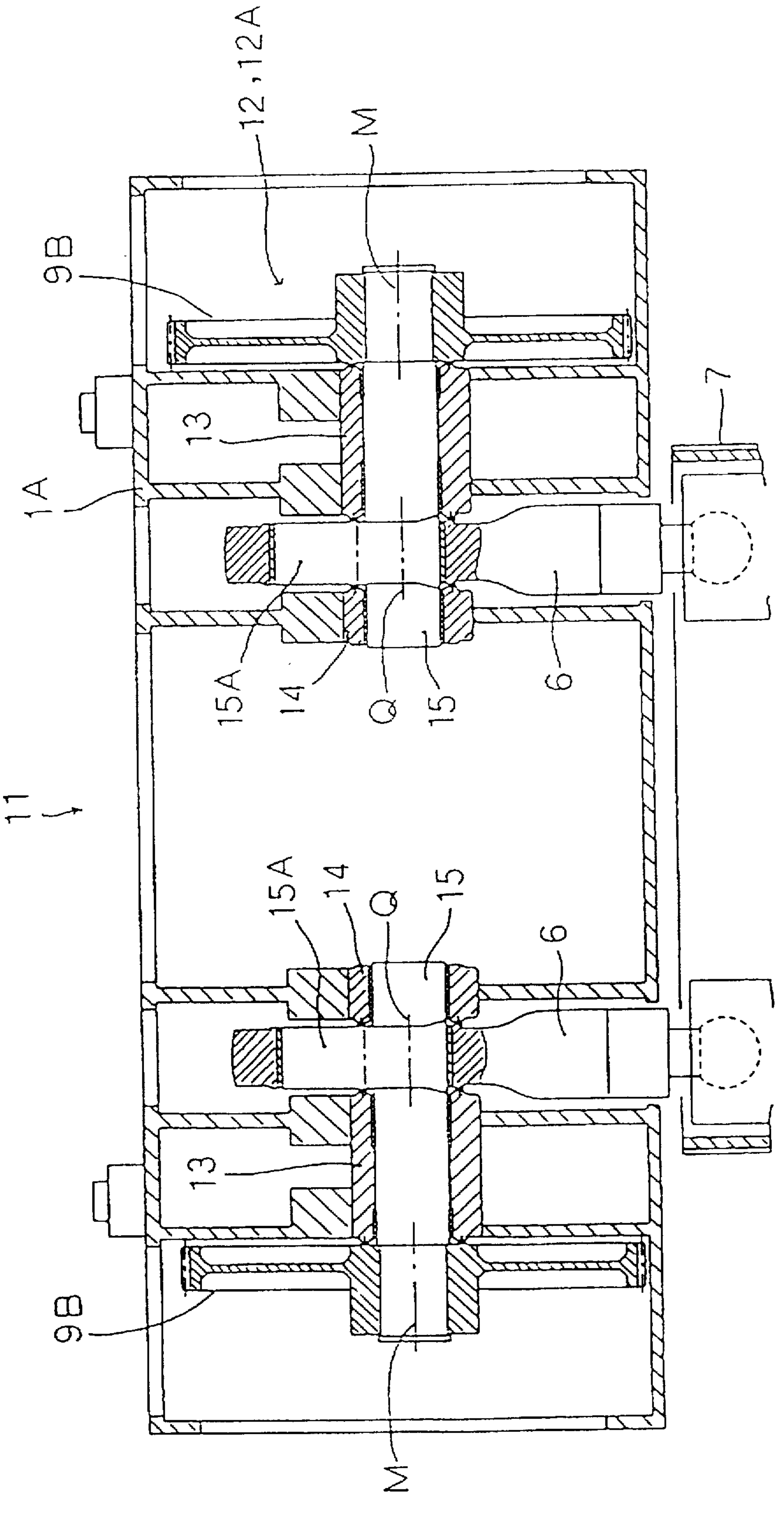
FIG. 2 shows a second embodiment of the present invention and is a front sectional view of a mechanical press wherein uniform rotation mechanisms are incorporated in the frame of the first embodiment.

FIGS. 1 and 2 are concerned with a straight side type pressing machine wherein an eccentric crankshaft is employed and a main gear is disposed at each of opposite ends of a frame outside connecting rods. FIG. 1 shows a first embodiment of the pressing machine using an ununiform rotation mechanism with a slider mechanism, and FIG. 2 shows a second embodiment of the pressing machine using a uniform rotation mechanism.

In FIG. 1 which illustrates a pair of ununiform rotation mechanisms, crankshafts 5, 5 are rotatably supported by bearing flanges 3, 3 having bosses 3A, 3A and bearing flanges 4, 4, these flanges being provided on a frame 1A of a pressing machine 1, and connecting rods 6, 6 are slidably fitted over eccentric portions 5A, 5A of the crankshafts 5, 5. A slide 7 coupled to the connecting rods 6, 6 is caused to move vertically with rotation of the crankshafts 5, 5. At each end of the frame 1A, a main gear 9A is slidably fitted over the boss 3A of the bearing flange 3 and is meshed with a drive gear 8.

A pin 17 with a slider 16 fitted over the same is fixed to a side of the main gear 9A, a lever 18 is fixed to each end of the crankshaft 5 at an angular position 180 degree out of phase with respect to the eccentric direction of the crankshaft 5, and the slider 16 is held in a groove 19 formed in the lever 18, thereby constructing a slide driver 2 with an ununiform rotation mechanism 2A.

Figure 3:
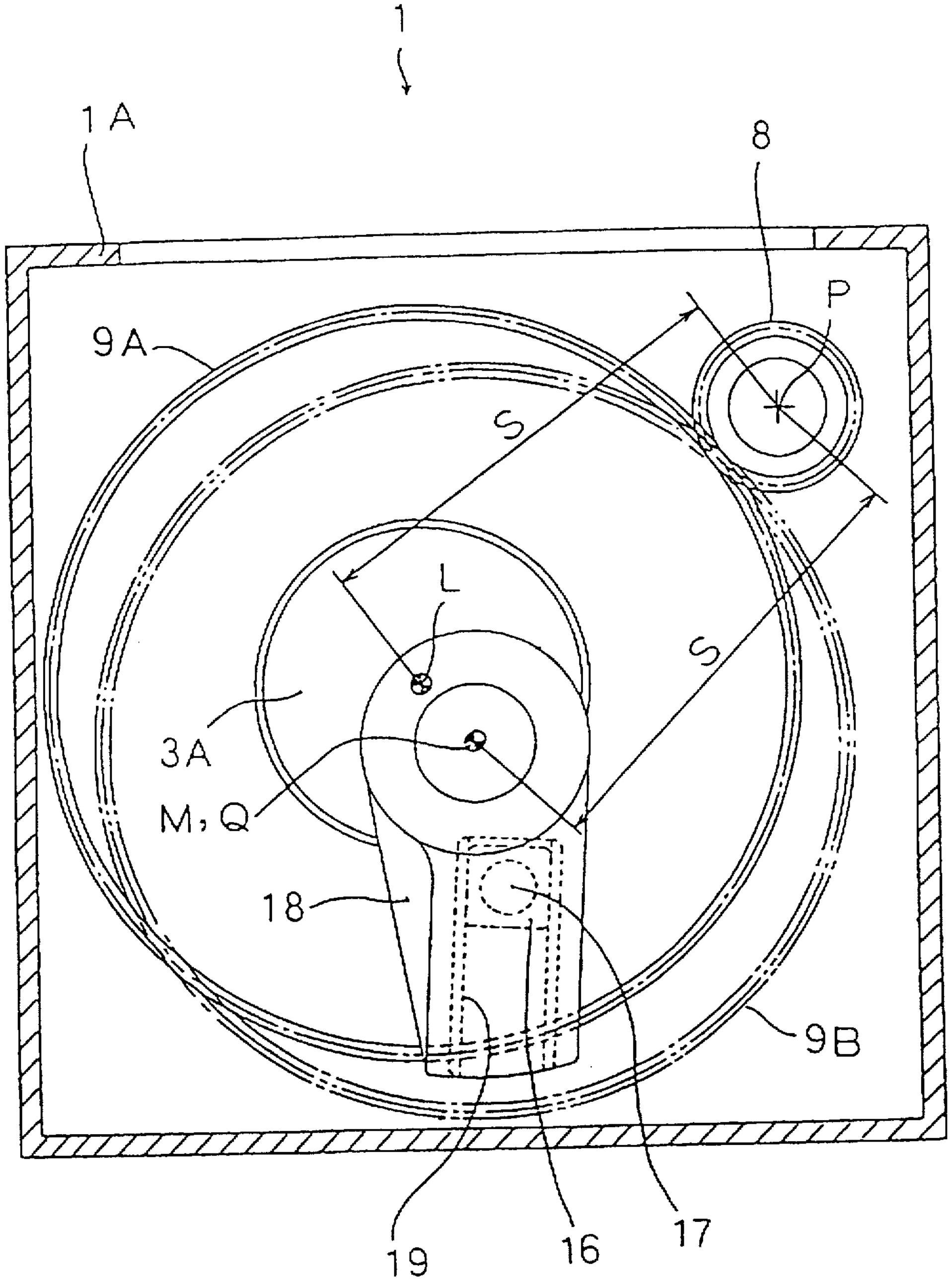
FIG. 3 is a left side view showing arrangement of a drive gear, main gears and a lever in the uniform rotation mechanism of the second embodiment and the ununiform rotation mechanism of the first embodiment.

FIG. 3 shows arrangement of the drive gear 8, the main gears 9A, 9B and the lever 18 of the ununiform rotation mechanism 2A and a uniform rotation mechanism 12A which are each incorporated in the frame 1A, as viewed from the left side of the frame 1A. L represents the center of the main gear 9A of the ununiform rotation mechanism 2A and M represents the center of the main gear 9B of the uniform rotation mechanism 12A. In both the ununiform rotation mechanism 2A and the uniform rotation mechanism 12A, the centers Q of the crankshafts 5, 15 and the centers P of the drive gears 8 are the same. The main gears 9A, 9B are fitted over the respective bearing flanges 3, 13 and meshed with the respective drive gears 8 so that the center-to-center distances S between the main gears and the drive gears are the same.

Therefore, regardless of whether the slider driver 2 or 12 is of the ununiform rotation mechanism 2A or the uniform rotation mechanism 12A, it can be incorporated in the same frame 1A.

Additionally, dynamic balancing units 20 are disposed in a central portion of the frame 1A so as to eliminate dynamic unbalance caused by the inertial force when the slide 7 having an upper mold (not shown) attached thereto is moved vertically.

FIG. 2 shows a second embodiment of the present invention, i.e., a pressing machine 11, wherein a slide driver 12 with the uniform rotation mechanism 12A is constructed by incorporating the uniform rotation mechanism 12A in the same frame as the frame 1A in which the ununiform rotation mechanism 2A shown in FIG. 1 is incorporated.

Crankshafts 15, 15 are rotatably supported by bearing flanges 13 and bearing flanges 14 which are provided on the frame 1A of the pressing machine 11, and connecting rods 6, 6 are slidably fitted over eccentric portions 15A, 15A of the crankshafts 15, 15. A slide 7 coupled to the connecting rods 6, 6 is caused to move vertically with rotation of the crankshafts 15, 15.

At each end of the frame 1A, a main gear 9B is fixedly fitted over an end of the crankshaft 15 and is meshed with a drive gear 8, as shown in FIG. 3, thereby constructing the slide driver 12 with the ununiform rotation mechanism 12A.

Figure 4:
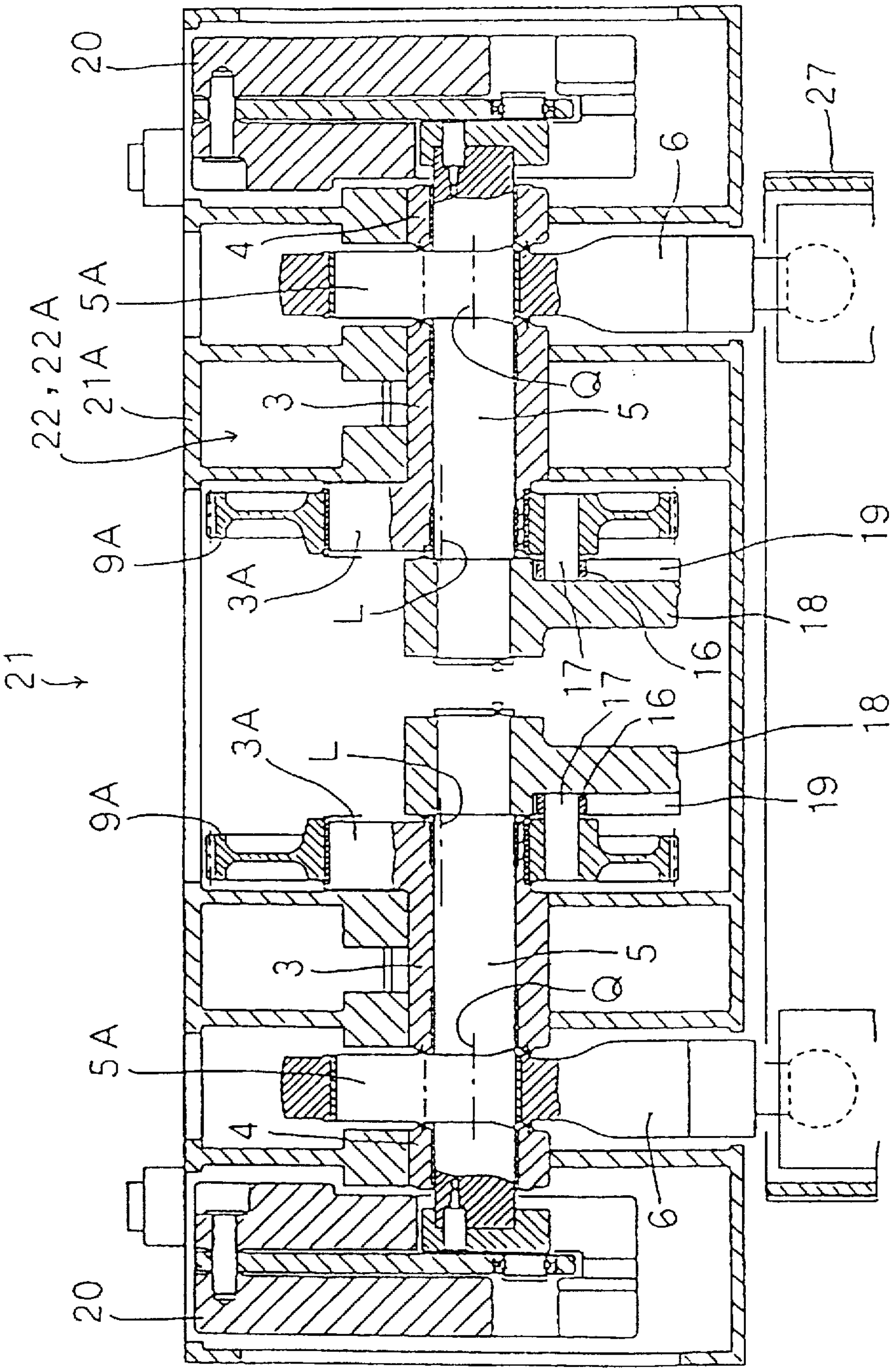
FIG. 4 shows a third embodiment of the present invention and is a front sectional view of a mechanical press including ununiform rotation mechanisms wherein main gears are disposed in a central portion of a frame.

FIG. 4 shows a third embodiment of the present invention, i.e., a straight side type pressing machine 21, wherein main gears 9A, 9A are disposed in a central portion of a frame 21A inside connecting rods 6, 6. A slide driver 22 with an ununiform rotation mechanism 22A including a slider mechanism is incorporated in each side of the frame 21A. Similarly to the slide driver 2 with the ununiform rotation mechanism 2A of the first embodiment shown in FIG. 1, a dynamic balancing unit 20 is disposed but at each of opposite ends of the frame 21A. The ununiform rotation mechanism 22A is made up of the same parts as the ununiform rotation mechanism 2A of the first embodiment.

Figure 5:
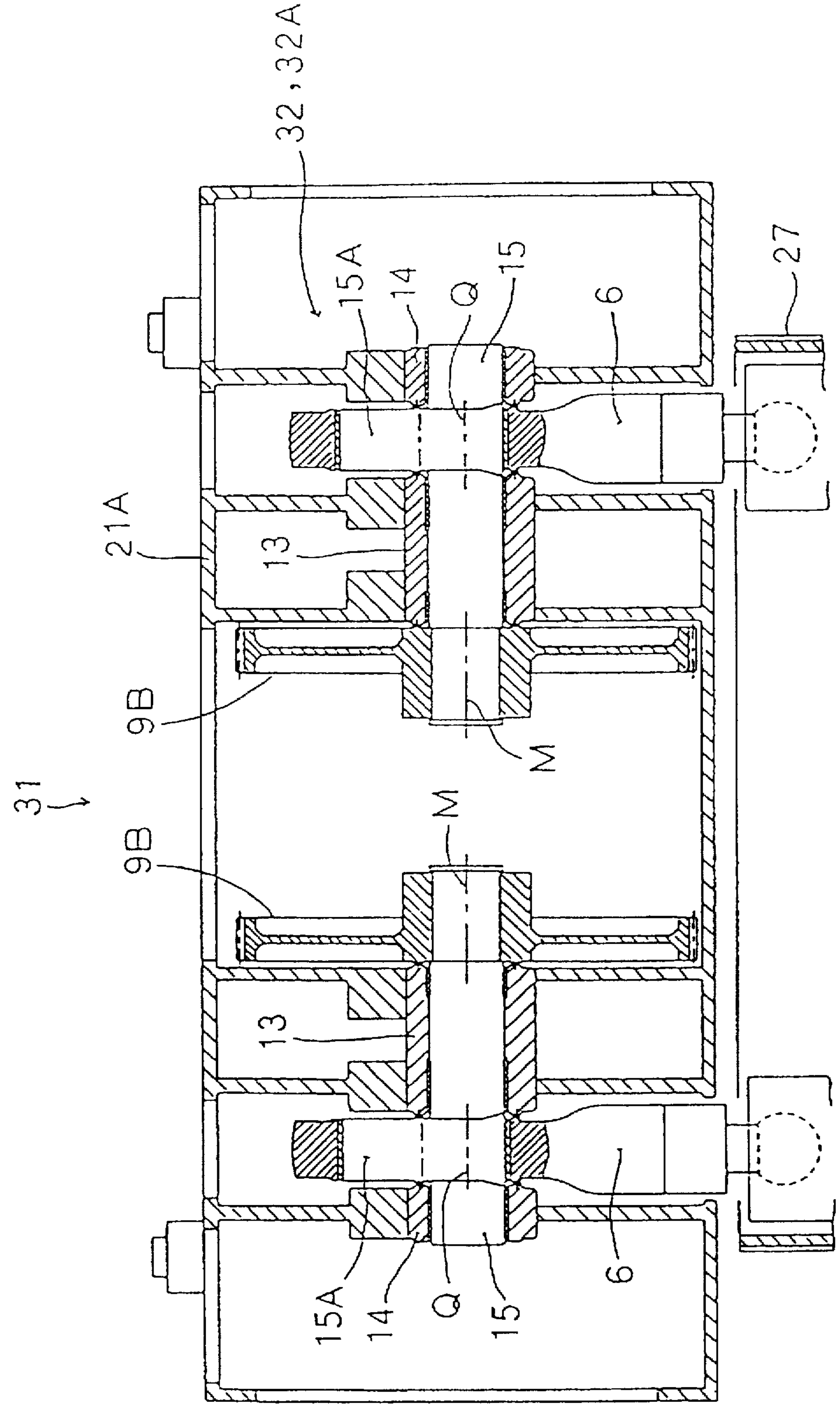
FIG. 5 shows a fourth embodiment of the present invention and is a front sectional view of a mechanical press wherein uniform rotation mechanisms are incorporated in the frame of the third embodiment.

FIG. 5 shows a fourth embodiment of the present invention, i.e., a pressing machine 31, wherein a slide driver 32 with a uniform rotation mechanism 32A is constructed by incorporating the uniform rotation mechanism 32A in the same frame as the frame 21A in which the ununiform rotation mechanism 22A of the third embodiment is incorporated.

Then, the uniform rotation mechanism 32A is made up of the same parts as the uniform rotation mechanism 12A of the second embodiment shown in FIG. 2.

As with the first and second embodiments shown in FIGS. 1 and 2, the positional relationship shown in FIG. 3 is equally applied to the third and fourth embodiments shown in FIGS. 4 and 5. Specifically, L also represents the center of the main gear 9A of the ununiform rotation mechanism 22A and M also represents the center of the main gear 9B of the uniform rotation mechanism 32A. In both the ununiform rotation mechanism 22A and the uniform rotation mechanism 32A, the centers Q of the crankshafts 5, 15 and the centers P of the drive gears 8 are the same. The main gears 9A, 9B are fitted over the respective bearing flanges 3, 13 and meshed with the respective drive gears 8 so that the center-to-center distances S between the main gears and the drive gears are the same. Therefore, regardless of whether the slider driver 22 or 32 is of the ununiform rotation mechanism 22A or the uniform rotation mechanism 32A, it can be incorporated in the same frame 21A.

According to the present invention, as is apparent from the foregoing description, in any case of employing the ununiform rotation mechanisms for the crankshafts 5, 5 or the uniform rotation mechanisms for the crankshafts 15, 15, the same frame can be used without changing a speed reducing ratio between the drive gear and the main gear, and components of the slide drivers can be used in common. It is thus possible to improve production efficiency and shorten a period of working time required.

Furthermore, in the ununiform rotation mechanism, a rotation balancing weight which has been provided on the crankshaft in the prior art can be dispensed with.

What is claimed is:

1. A straight side type pressing machine in which power from a flywheel is selectively transmitted using either uniform or ununiform rotation, through a main gear meshing with a drive gear of a drive shaft, to a crankshaft supported by a bearing member provided on a frame, and a slide is vertically moved by a connecting rod slidably fitted over said crankshaft and said slide for connection therebetween, wherein:

said drive shaft is disposed in a position equi-distanced from a center of rotation of a respective main gear of either an ununiform rotation mechanism or a uniform rotation mechanism either for rotating said crankshaft to drive said slide, said main gear of either said ununiform rotation mechanism or said uniform rotation mechanism having the same number of teeth and the same tooth size, and a drive gear mounted on said drive shafts is selectively meshed with one of said respective main gears, while a speed reducing ratio and a frame are kept the same common to either said ununiform rotation mechanism or said uniform rotation mechanism.

2. A straight side type pressing machine in which power from a flywheel is selectively transmitted using either uniform or ununiform rotation, through a main gear meshing with a drive gear of a drive shaft, to a crankshaft supported by a bearing member provided on a frame, and a slide is vertically moved by a connecting rod slidably fitted over said crankshaft and said slide for connection therebetween, wherein:

a slide driver comprises either an ununiform rotation mechanism or a uniform rotation mechanism, said ununiform rotation mechanism including a slider mechanism provided with a lever, said lever being disposed to orient 180 degree out of phase with respect to the eccentric direction of a crankpin to thereby obviate a rotation balancing weight for absorbing unbalance due to crank motion, main gears having the same number of teeth and the same tooth size are provided in either said ununiform rotation mechanism or said uniform rotation mechanism, said drive shaft is disposed in a position equi-distanced from a center of rotation of either of said respective main gears, and a drive gear mounted on said drive shafts is selectively meshed with one of said respective main gears, while a speed reducing ratio and a frame are kept the same common to said ununiform rotation mechanism or said uniform rotation mechanism.

* * * * *